United States Patent [19]

Ito et al.

[11] Patent Number: 4,462,079
[45] Date of Patent: Jul. 24, 1984

[54] APPARATUS FOR PROVIDING INFORMATION FOR AGRICULTURAL WORK MACHINE

[75] Inventors: Osamu Ito, Toyota; Nobuhito Hobo, Inuyama; Tetsuya Nakamura, Chiryu, all of Japan

[73] Assignee: Nippondenso Co., Ltd., Kariya, Japan

[21] Appl. No.: 298,517

[22] Filed: Sep. 1, 1981

[30] Foreign Application Priority Data

Sep. 11, 1980 [JP] Japan .............................. 55-126831

[51] Int. Cl.³ ............................................. G08B 19/00
[52] U.S. Cl. ................................... 364/442; 340/684; 364/424; 364/551
[58] Field of Search ............... 364/424, 442, 560, 564, 364/551; 377/9, 16, 24, 19; 340/684

[56] References Cited

U.S. PATENT DOCUMENTS

| | | | |
|---|---|---|---|
| 4,093,107 | 6/1978 | Allman et al. ........................ | 364/564 |
| 4,157,030 | 6/1979 | Keely .................................... | 364/442 |
| 4,229,799 | 10/1980 | Herwig ................................. | 364/564 |
| 4,296,409 | 10/1981 | Whitaker et al. .................... | 364/424 |

Primary Examiner—Errol A. Krass
Attorney, Agent, or Firm—Cushman, Darby & Cushman

[57] ABSTRACT

Apparatus for providing information for an agricultural work machine comprising a distance detector which detects the distance travelled by an agricultural vehicle, a fuel consumption detector, which detects the amount of fuel consumed by the engine of the agricultural vehicle, a circuit for inputting the working width of the agricultural vehicle, an operating circuit for calculating fuel consumption rate indicative of the amount of fuel consumed per unit working area, and a display for displaying the calculated information. The fuel consumption detector may be replaced with a timer which detects the working time of the agricultural vehicle so that working efficiency may be obtained in place of the fuel consumption rate. The total area to be worked may be input in order to estimate the time of completion of the agricultural work or the fuel consumption rate at the time of completion of the work. Various function keys may be provided to selectively obtain necessary information among various kinds of information.

10 Claims, 4 Drawing Figures

APPARATUS FOR PROVIDING INFORMATION FOR AGRICULTURAL WORK MACHINE

BACKGROUND OF THE INVENTION

This invention relates generally to apparatus for providing information related to an agricultural work machine, and more particularly, the present invention relates to apparatus mounted on an agricultural vehicle for supplying the vehicle operator with information useful for agricultural work.

When effecting agricultural work with an agricultural vehicle or a movable agricultural machine, such as a tractor or a cultivator, if various information, such as fuel consumption rate, working efficiency or the like, is obtained by detecting necessary data, it would be convenient for the operator of the agricultural vehicle. Furthermore, if the time of completion of the work (assuming work is continued under the same conditions), as well as the amount of fuel which will be consumed at the end of the work or the like is estimated, the operator of the agricultural vehicle may utilize such information in various ways. For instance, the operator may change the manner of operation to complete the work within a given period of time or to consume less fuel. Namely, the above-mentioned various information may be utilized for time and/or fuel control.

SUMMARY OF THE INVENTION

This invention has been developed in view of the foregoing. It is, therefore, an object of the present invention to provide apparatus for providing information for agricultural work, which information may be utilized for raising the working efficiency.

In accordance with the present invention there is provided apparatus for providing information for an agricultural work machine, comprising: (a) first means for detecting the working distance of an agricultural vehicle; (b) second means for detecting the amount of fuel consumed by the prime mover of the agricultural vehicle; (c) third means for inputting the working width of the agricultural vehicle; (d) fourth means responsive to the distance data from the first means, to the fuel consumption data from the second means and to the working width data from the third means, for calculating the amount of fuel consumed per unit working area; and (e) fifth means for displaying information from the fourth means.

In accordance with the present invention there is also provided apparatus for providing information for an agricultural work machine, comprising: (a) first means for detecting the working distance of an agricultural vehicle; (b) second means for detecting the working time of the agricultural vehicle; (c) third means for inputting the working width by the agricultural vehicle; (d) fourth means responsive to the distance data from the first means, to the working time from the second means and to the working width data from the third means, for calculating working efficiency indicative of area worked per unit time or an interval required for working over unit working area; and (e) fifth means for displaying information from the fourth means.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE PREFERRED EMBODIMENT

Figure 1:
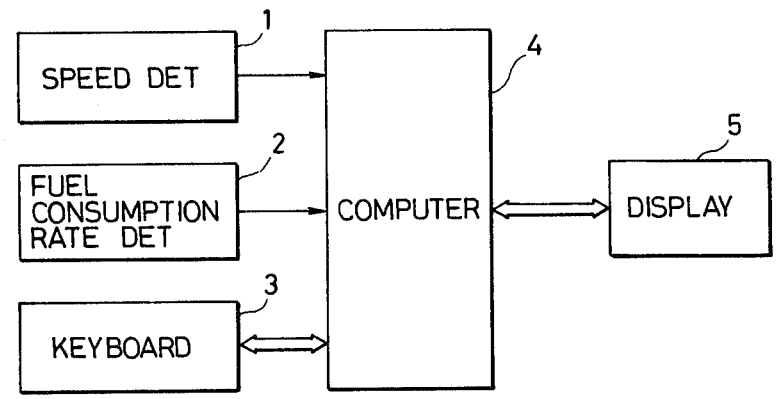
FIG. 1 is a schematic block diagram of an embodiment of the present invention.

Referring to FIG. 1, a schematic block diagram of the apparatus according to the present invention is shown. The apparatus is mounted on an agricultural vehicle, such as a tractor or a cultivator, which is not illustrated for simplicity. The words "agricultural vehicle" will be used in this application to mean any kind of movable machines which can be used for performing agricultural work. The conventional agricultural vehicle comprises an internal combustion engine as a prime mover for travelling by itself. The engine is supplied with fuel from a suitable fuel tank.

The apparatus of FIG. 1 comprises: a speed detector 1 which produces an output signal indicative of the travelling speed of the agricultural vehicle, a fuel consumption rate or amount detector 2 (this will be simply referred to as a fuel consumption rate detector hereafter) which produces an output signal indicative of the rate or amount of fuel consumed by the engine of the agricultural vehicle; a keyboard 3 for inputting various data and instructions; a computer 4 for operating on various data from the speed detector 1, from the fuel consumption rate detector 2 and from the keyboard 3; and a display device 5 for displaying information obtained as a result of operation by the computer 4. The speed detector 1 is conventional, and may comprise a counter for counting the number of pulses produced in synchronism with the rotation of the propeller shaft or wheel of the agricultural vehicle. The fuel consumption rate detector 2 is also conventional, and may be actualized by measuring the flow rate of the fuel from the fuel tank to the engine or by deriving data indicative of the operation of an electronic fuel injection system of the engine in the case that the engine is equipped with such a fuel injection system. The keyboard 3 may be used not only for giving necessary input data to the computer 4 but also for controlling the computer 4 so as to display required information. The computer 4 performs the functions of a clock (where the clock can be achieved by either hardware or software design), and is arranged to calculate an objective numerical value, such as the amount of fuel consumed per unit working area or the working efficiency of an agricultural work. The display device 5 comprises a numeric display portion so as to inform the operator of the agricultural vehicle of necessary information.

Figure 2:
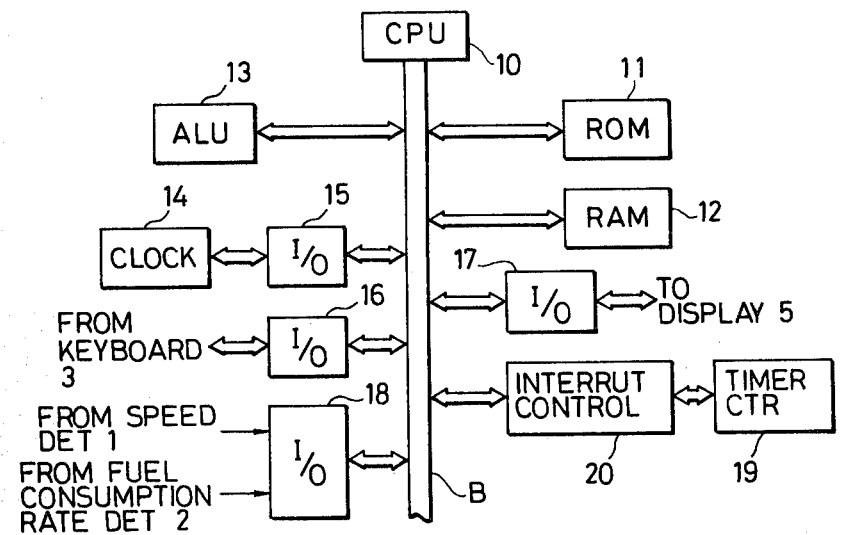
FIG. 2 is a schematic block diagram of the computer of FIG. 1.

FIG. 2 shows the structure of the computer 4 of FIG. 1. The computer 4 comprises a central processing unit (CPU) 10 of 8-bit type (8085A manufactured by Intel is used in this embodiment); a read-only memory (ROM) 11 in which operational program is prestored; and a random access memory (RAM) 12 for temporarily storing various data during operation of the CPU 10. ROM 11 and RAM 12 are respectively connected via a bus "B" to the CPU 10 in the conventional manner. In addition to the ROM 11 and RAM 12, the computer 4 comprises additional circuits, including an arithmetic and logic unit (ALU) 13 which executes multiplication and division by its hardware design. The ALU 13 is also connected to the bus "B". A clock 14, actualized by hardware design, is arranged to be supplied with power all the time, and is connected to the bus "B" via an interface, i.e., an input/output device (I/O) 15. The reference 16 is an interface I/O for the keyboard 3 of FIG. 1, while the reference 17 is an interface I/O for the display device 5 shown in FIG. 1. The reference 18 is an interface for the speed detector 1 and the fuel consumption rate detector 2 so as to supply the CPU 10 with input data from these detectors 1 and 2. The reference 19 is a timer counter connected via an interrupt control circuit 20 to the bus "B". The timer counter 19 produces an output signal at an interval by counting the number of clock pulses from a clock generator of the CPU 10 so that the interrupt control circuit produces an interrupt request signal causing the CPU 10 to interrupt its operation. As a result of an interrupt, speed data from the speed detector 1 and fuel consumption data from the fuel consumption rate detector 2 are respectively written in designated addresses of the RAM 12.

The operation of the computer 4 of FIGS. 1 and 2 will be described in detail with reference to a flowchart of FIG. 3. When power is supplied to the computer 4, the computer 4 starts operating from a start step 100. At first, in a following initializing step 101, the storing regions of the RAM 12 are set to an initial condition. This operation of setting to an initial condition involves operation of resetting various data "T", "D" and "F", which will be described later, to zero. After power is supplied, if there is no instruction for display from the operator through the keyboard 3, the computer 4 executes a clock mode storing step 107a and clock displaying step 108a. In the clock mode storing step 107a, a given word indicative of the clock mode is stored in a mode storing region of the RAM 12, while in the clock displaying step 108a, a time display instruction is applied to the display device 5.

After this, it is detected whether masking of an interrupt port has been cancelled in a step 102. Since it is programmed to mask the interrupt port in the initializing step 101 whenever power is supplied, the answer of the step 102 becomes NO, and the operation proceeds to a step 103. In the step 103, it is detected whether a given key of the keyboard 3 has been depressed, to start reading the speed data and fuel consumption rate data. If the key has not been depressed yet steps 106a to 106z are executed in which it is detected whether respective function keys of the keyboard 3 have been depressed or not. If one of the function keys has been depressed, a given word indicative of a corresponding function mode will be stored in the mode storing region of the RAM 12 in accordance with a mode storing instruction in one of the steps 107a to 107z. Then a designated operation of one of the steps 108a to 108z will be executed. On the other hand, if it is detected that none of the function keys has been depressed, a step 109 takes place in which the contents of the mode storing region of the RAM 12 will be read out. Accordingly, one of the steps 108a to 108z will be executed in accordance with the mode read out. Therefore, at least one of the steps 108a to 108z is executed before returning to the mask-cancellation detecting step 102.

Figure 3:
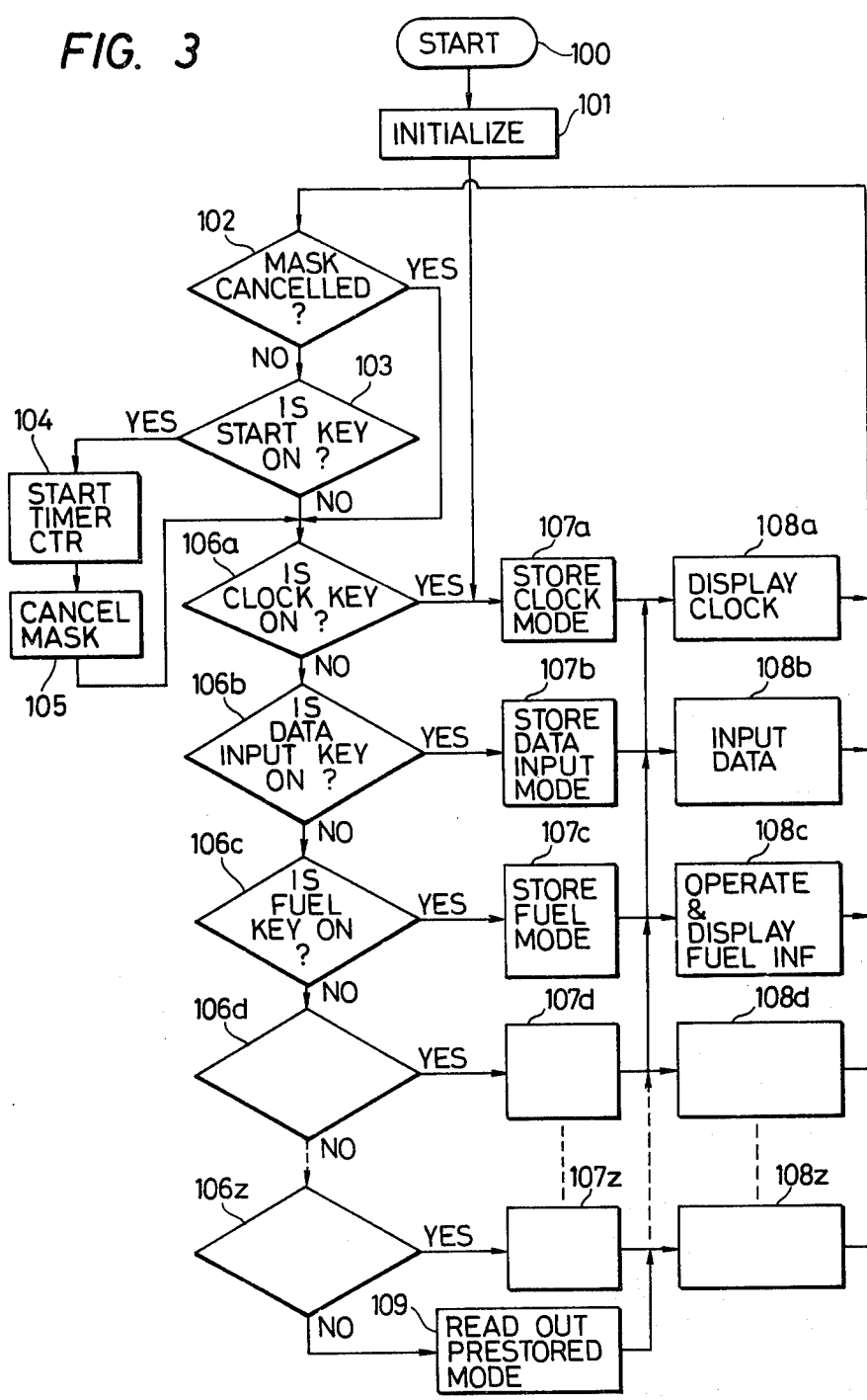
FIG. 3 is a flow chart showing the operational process of the computer of FIG. 1.

The above operation is repeatedly performed as will be understood from the flowchart of FIG. 3. It is assumed that the operator starts driving the agricultural vehicle. The operator depresses a start key on the keyboard 3 initiating the above-mentioned speed data and fuel consumption rate data reading. In the loop of the operational steps, when reaching a step 103, in which it is detected whether the start key has been depressed or not, the answer of the step 103 will be YES to execute a step 104. In the step 104, the timer counter 19 of FIG. 2 is started to count the number of clock pulses. When the contents of the timer counter 19 reach a predetermined value, a step 105 takes place to cancel the interrupt mask. Thus, interruption is effected each time the timer counter 19 counts up to the predetermined value. When interruption has occurred, the computer 4 executes an interrupt routine of FIG. 4. Namely, the interrupt routine is executed at predetermined intervals, and each time the execution of the interrupt routine has been completed, the operational flow returns to the main routine of FIG. 3.

Figure 4:
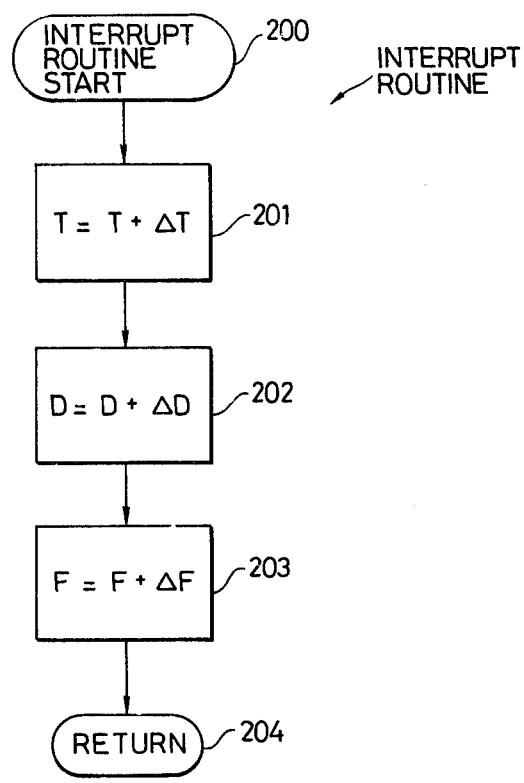
FIG. 4 is a flow chart showing the operational process of an interrupt routine.

Reference is now made to FIG. 4 illustrating the interrupt routine. When the CPU 10 is interrupted with timer counter 19 counted up, the operation of the computer 4 shifts to a step 200 of the interrupt routine. In a following step 201, time data $T$ is increased by $\Delta T$ which corresponds to an interval required for counting up to the predetermined value by the timer counter 19; namely, the time data $T$ read out from the RAM 12 is renewed. Next, in a step 202, distance data $D$ is increased by $\Delta D$ which corresponds to a distance travelled by the agricultural vehicle within the above-mentioned interval $\Delta T$. Furthermore, the amount of fuel $\Delta F$ consumed within the interval $\Delta T$ is calculated in a step 203 to be added to a fuel consumption data $F$ read out from the RAM 12. With these steps 201 to 203, each of the time data $T$, distance data $D$ and the fuel consumption data $F$ is renewed to record an integrated value from the time that the operator has depressed the start key to the present. After execution of the step 203, the operational flow enters into a returning step 204 to return to the main routine of FIG. 3.

Since the start key was depressed once, the interrupt mask has been cancelled in the step 105 as described in the above. Accordingly, the operational flow always branches to the direction of YES at the step 102 in the loop of the main routine of FIG. 3.

Various function keys may be provided to the keyboard 3 so as to derive various information from the display device 5. Although three function keys, i.e., clock key, data-input key and fuel consumption rate key, are provided in the illustrated embodiment, the number of the function keys may be increased if desired. When a function key is added, a detecting step 106x (106x indicates one of the steps 106d to 106z in FIG. 3) in which it is detected whether the corresponding key has been depressed or not, a storing step 107x in which the function mode is stored in the RAM 12, and an execution step 108x in which corresponding operation is executed, are also provided so that the operator can obtain desired information from the display device 5.

The operation of the apparatus according to the present invention will be described taking an example. As described in the above, the start key is depressed at the time of starting the operation of the agricultural vehicle. Therefore, the time data $T$, the distance data $D$ and the fuel consumption data $F$ are respectively renewed in response to the output signal of the timer counter 19 at a given interval. Namely, the total time, the total distance and the total amount of consumed fuel from the start of the operation up to now are respectively stored in the RAM 12. The operator inputs the working width data W corresponding to the width of the agricultural work effected by the agricultural vehicle using the keyboard 3 for storage in RAM 12. When the operator intends to check fuel information in terms of an amount of fuel consumed per unit working area, he or she may depress a corresponding function key, i.e., a fuel key in this case. The answer of the step 106c becomes YES to execute the step 107c to store the function mode of obtaining the fuel information in the RAM 12. Then the step 108c takes place to calculate the amount of fuel consumed per unit area by performing calculation represented by:

$$Fu = F/WD$$

wherein

Fu is the amount of fuel consumed per unit working area;

F is the amount of fuel consumed from the beginning of the agricultural work;

W is the working width of the agricultural vehicle; and

D is the distance travelled by the agricultural vehicle from the beginning of agricultural work.

This information Fu will be displayed by the display device 5 to inform the operator of the same.

Although the embodiment of the present invention has been described taking an example of a case that the amount of fuel consumed per unit working area is obtained, other information will be readily obtained in the same manner. For instance, if the total area to be worked by the agricultural vehicle is known, the total area data may be input by the keyboard 3, so that the amount of fuel which will be consumed at the time of completion of the work can be estimated. Furthermore, other information may be obtained as follows. When it is intended to obtain working efficiency, i.e., the working time divided by working area, rather than the fuel consumption information, the fuel consumption rate detector 2 of FIG. 1 may be replaced with a timer, which counts clock pulses, to obtain time information after the start key has been depressed. In this case, the working efficiency indicative of time consumed for working over a unit area may be displayed. If the working area is divided by the working time, another working efficiency indicative of working area completed within unit time may be obtained. Moreover, in the case that the total area to be worked has been input as described in the above, the time of completion of the work can be estimated by multiplying the total area by the first mentioned working efficiency, i.e. the interval required for working over unit area.

The apparatus according to the present invention may provide other functions by adding necessary keys. Namely, if numerical keys and operation keys are provided to the keyboard 3, the apparatus may also be used as a calculator for performing the four rules of arithmetic.

The speed detector 1 used in the above-described embodiment may be replaced with a working distance detector which detects the working distance corresponding to the distance travelled by the agricultural vehicle after the start button has been depressed.

Although in the described embodiment a computer is used for operating various data to obtain necessary information, the computer 4 of FIG. 1 may be replaced with logic circuits. In addition, although it has been described that the working width data W is to be input via the keyboard 3, this data W may be prestored in a region of the ROM 11.

From the foregoing description, it will be understood that the apparatus according to the present invention is capable of informing the operator of the agricultural vehicle of various information which is useful for effectively operating the agricultural vehicle. Namely, the operator may control the working speed as well as the working time. As described in the above, since the apparatus can be designed to display various information in response to a selected key of the keyboard 3, the operator can obtain desired information whenever he or she intends to do so.

The above-described embodiment is just an example of the present invention, and therefore, it will be apparent for those skilled in the art that many modifications and variations may be made without departing from the spirit of the present invention.

What is claimed is:

1. Apparatus for providing information for an agricultural work machine of the type including a fuel consuming prime mover, comprising:
   (a) first means for detecting the working distance of an agricultural vehicle and producing a working distance signal;
   (b) second means for detecting the amount of fuel consumed by said prime mover of said agricultural vehicle and producing a fuel consumption signal;
   (c) third means for inputting the working width of said agricultural vehicle;
   (d) fourth means for periodically renewing working distance data and fuel consumption data by accumulating said working distance signal and said fuel consumption signal respectively;
   (e) fifth means for designating one particular mode among a plurality of modes including fuel consumption rate mode and data input mode;
   (f) sixth means for storing a signal indicative of a mode designated by said fifth means;
   (g) seventh means for selectively calculating an average working efficiency represented by an amount of consumed fuel per unit area by using said working distance data, fuel consumption data and working width data when the signal stored in said sixth means indicates said fuel consumption rate mode; and
   (h) eighth means for displaying said average working efficiency with a display mode being switched from another information display mode to working efficiency display mode in receipt of an average working efficiency information from said seventh means.

2. Apparatus for providing information for an agricultural work machine, comprising:
   (a) first means for detecting the working distance of an agricultural vehicle and producing a working distance signal;
   (b) second means for detecting the working time of said agricultural vehicle and producing a working time signal;
   (c) third means for inputting the working width of said agricultural vehicle;
   (d) fourth means for periodically renewing working distance data and working time data by accumulating said working distance signal and said working time signal respectively;

(e) fifth means for designating one particular mode among a plurality of modes including working speed mode and data input mode;

(f) sixth means for storing a signal indicative of a mode designated by said fifth means;

(g) seventh means for calculating an average working efficiency in the form of a working time per unit working area by using said working distance data, working time data and working width data when the signal stored in sixth means indicates said working speed mode; and (h) eighth means for displaying said average working efficiency with a display mode being switched from another information display mode to working efficiency display mode in receipt of average working efficiency information from said seventh means.

3. Apparatus for providing information for an agricultural work machine, comprising:

(a) first means for detecting the working distance of an agricultural vehicle and producing a working distance signal;

(b) second means for detecting the working time of said agricultural vehicle and producing a working time signal;

(c) third means for inputting the working width of said agricultural vehicle;

(d) fourth means for periodically renewing working distance data and working time data by accumulating said working distance signal and said working time signal respectively;

(e) fifth means for designating one particular mode among a plurality of modes including working speed mode and data input mode;

(f) sixth means for storing a signal indicative of a mode designated by said fifth means;

(g) seventh means for calculating an average working efficiency in the form of a working area per unit time by using said working distance, working time data and working width data when the signal stored in said sixth means indicates said working speed mode; and (h) eighth means for displaying said average working efficiency with a display mode being switched from another information display mode to working efficiency display mode in receipt of average working efficiency information from said seventh means.

4. Apparatus as claimed in claim 1, 2, or 3, wherein said first means comprises a speed detector which produces an output signal indicative of the travelling speed of said agricultural vehicle.

5. Apparatus as claimed in claim 1, 2, or 3, wherein said third means comprises a keyboard for manually inputting said working width data.

6. Apparatus as claimed in claim 1, 2, or 3, wherein said third means comprises a memory in which said working width data has been prestored.

7. Apparatus as claimed in claim 1, 2, or 3, wherein said fourth means comprises a computer arranged to periodically read said data from said first and second means.

8. Apparatus as claimed in claim 1, 2, or 3, further comprising a function key with which said fourth means is controlled to perform calculation.

9. Apparatus as claimed in claim 1, 2, or 3, further comprising sixth means for inputting the total area to be worked by said agricultural vehicle and means responsive to said data from said first to third and said sixth means for estimating time of completion of the work.

10. Apparatus as claimed in claim 1, further comprising ninth means for inputting the total area to be worked by said agricultural vehicle and means responsive to said data from said first to third and said ninth means for estimating the amount of fuel which will be consumed at the time of completion of the work of said total area.

* * * * *